US009807692B2

(12) United States Patent
Klein et al.

(10) Patent No.: US 9,807,692 B2
(45) Date of Patent: *Oct. 31, 2017

(54) SYSTEMS AND METHODS FOR PROVIDING POWER MANAGEMENT

(71) Applicant: BROADCOM CORPORATION, Irvine, CA (US)

(72) Inventors: Philippe Klein, Jerusalem (IL); Avraham Kliger, Ramat Gan (IL); Yitshak Ohana, Givat Zeev (IL)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 154 days.

This patent is subject to a terminal disclaimer.

(21) Appl. No.: 14/794,662

(22) Filed: Jul. 8, 2015

(65) Prior Publication Data
US 2015/0327175 A1 Nov. 12, 2015

Related U.S. Application Data

(63) Continuation of application No. 12/511,165, filed on Jul. 29, 2009, now Pat. No. 9,112,717.
(Continued)

(51) Int. Cl.
H04N 7/18 (2006.01)
H04W 52/02 (2009.01)
(Continued)

(52) U.S. Cl.
CPC ......... H04W 52/0235 (2013.01); H04L 12/12 (2013.01); H04L 12/2801 (2013.01);
(Continued)

(58) Field of Classification Search
CPC combination set(s) only.
See application file for complete search history.

(56) References Cited

U.S. PATENT DOCUMENTS 3,836,888 A 9/1974 Boenke et al.
4,413,229 A 11/1983 Grant
(Continued)

FOREIGN PATENT DOCUMENTS

CN 1422043 A 6/2003
CN 1588827 A 3/2005
(Continued)

OTHER PUBLICATIONS

"Multichannel News, MoCA Brewing Up Bigger Bandwidth," Dec. 2008 Interview with CTO Anton Monk, http://www.multichannel.com/article/160878-MoCA_Brewing_Up_Bigger_Bandwidth.php.
(Continued)

Primary Examiner — Ngoc Vu
(74) Attorney, Agent, or Firm — McDermott Will & Emery LLP

(57) ABSTRACT

A network device includes one or more memories and one or more processor circuits coupled to the one or more memories. The one or more processor circuits are configured to cause providing for transmission a request directed to a network controller to change a power state of the network device, receiving a grant from the network controller in response to the request, and changing the power state of the network device in response to receiving the grant. The power state of the network device includes a running power state and a standby power state, where the standby power state includes an active mode and an idle mode. A network controller for granting a request from the network device to change a power state of the network device is also disclosed.

20 Claims, 10 Drawing Sheets

Related U.S. Application Data

(60) Provisional application No. 61/187,616, filed on Jun. 16, 2009, provisional application No. 61/085,096, filed on Jul. 31, 2008.

(51) Int. Cl.
*H04W 72/14* (2009.01)
*H04W 28/26* (2009.01)
*H04W 76/04* (2009.01)
*H04L 12/12* (2006.01)
*H04L 12/28* (2006.01)
*H04L 12/40* (2006.01)

(52) U.S. Cl.
CPC ....... *H04W 28/26* (2013.01); *H04W 52/0222* (2013.01); *H04W 72/14* (2013.01); *H04W 76/045* (2013.01); *H04L 12/2838* (2013.01); *H04L 12/2859* (2013.01); *H04L 12/40039* (2013.01); *H04L 2012/2849* (2013.01); *Y02B 60/32* (2013.01); *Y02B 60/34* (2013.01); *Y02B 60/35* (2013.01); *Y02B 60/50* (2013.01)

(56) References Cited

U.S. PATENT DOCUMENTS

| | | | |
|---|---|---|---|
| 4,536,875 A | 8/1985 | Kume et al. | |
| 4,608,685 A | 8/1986 | Jain et al. | |
| 4,893,326 A | 1/1990 | Duran et al. | |
| 5,052,029 A | 9/1991 | James et al. | |
| 5,170,415 A | 12/1992 | Yoshida et al. | |
| 5,343,240 A | 8/1994 | Yu | |
| 5,421,030 A | 5/1995 | Baran | |
| 5,440,335 A | 8/1995 | Beveridge | |
| 5,570,355 A | 10/1996 | Dail et al. | |
| 5,638,374 A | 6/1997 | Heath | |
| 5,671,220 A | 9/1997 | Tonomura | |
| 5,796,739 A | 8/1998 | Kim et al. | |
| 5,802,173 A | 9/1998 | Hamilton-Piercy et al. | |
| 5,805,591 A | 9/1998 | Naboulsi et al. | |
| 5,805,806 A | 9/1998 | McArthur | |
| 5,815,662 A | 9/1998 | Ong | |
| 5,822,677 A | 10/1998 | Peyrovian | |
| 5,822,678 A | 10/1998 | Evanyk | |
| 5,845,190 A | 12/1998 | Bushue et al. | |
| 5,850,400 A | 12/1998 | Eames et al. | |
| 5,854,887 A | 12/1998 | Kindell et al. | |
| 5,856,975 A | 1/1999 | Rostoker et al. | |
| 5,877,821 A | 3/1999 | Newlin et al. | |
| 5,886,732 A | 3/1999 | Humpleman | |
| 5,896,556 A | 4/1999 | Moreland et al. | |
| 5,917,624 A | 6/1999 | Wagner | |
| 5,930,493 A | 7/1999 | Ottesen et al. | |
| 5,963,844 A | 10/1999 | Dail | |
| 5,982,784 A | 11/1999 | Bell | |
| 6,009,465 A | 12/1999 | Decker et al. | |
| 6,028,860 A | 2/2000 | Laubach et al. | |
| 6,055,242 A | 4/2000 | Doshi et al. | |
| 6,069,588 A | 5/2000 | O'Neill, Jr. | |
| 6,081,519 A | 6/2000 | Petler | |
| 6,081,533 A | 6/2000 | Laubach et al. | |
| 6,111,911 A | 8/2000 | Sanderford, Jr. et al. | |
| 6,118,762 A | 9/2000 | Nomura | |
| 6,157,645 A | 12/2000 | Shobatake | |
| 6,167,120 A | 12/2000 | Kikinis | |
| 6,192,070 B1 | 2/2001 | Poon et al. | |
| 6,219,409 B1 | 4/2001 | Smith et al. | |
| 6,229,818 B1 | 5/2001 | Bell | |
| 6,243,413 B1 | 6/2001 | Beukema | |
| 6,304,552 B1 | 10/2001 | Chapman et al. | |
| 6,307,862 B1 | 10/2001 | Silverman | |
| 6,434,151 B1 | 8/2002 | Caves et al. | |
| 6,466,651 B1 | 10/2002 | Dailey | |
| 6,481,013 B1 | 11/2002 | Dinwiddie et al. | |
| 6,526,070 B1 | 2/2003 | Bernath et al. | |
| 6,553,568 B1 | 4/2003 | Fijolek et al. | |
| 6,563,829 B1 | 5/2003 | Lyles et al. | |
| 6,567,654 B1 | 5/2003 | Coronel Arredondo et al. | |
| 6,611,537 B1 | 8/2003 | Edens et al. | |
| 6,622,304 B1 | 9/2003 | Carhart | |
| 6,637,030 B1 | 10/2003 | Klein | |
| 6,650,624 B1 | 11/2003 | Quigley et al. | |
| 6,745,392 B1 | 6/2004 | Basawapatna et al. | |
| 6,763,032 B1 | 7/2004 | Rabenko et al. | |
| 6,785,296 B1 | 8/2004 | Bell | |
| 6,816,500 B1 | 11/2004 | Mannette et al. | |
| 6,831,899 B1 | 12/2004 | Roy | |
| 6,836,515 B1 | 12/2004 | Kay et al. | |
| 6,859,899 B2 | 2/2005 | Shalvi et al. | |
| 6,862,270 B1 | 3/2005 | Ho | |
| 6,877,043 B2 | 4/2005 | Mallory et al. | |
| 6,877,166 B1 | 4/2005 | Roeck et al. | |
| 6,898,210 B1 | 5/2005 | Cheng et al. | |
| 6,930,989 B1 | 8/2005 | Jones, IV et al. | |
| 6,940,833 B2 | 9/2005 | Jonas et al. | |
| 6,950,399 B1 | 9/2005 | Bushmitch et al. | |
| 6,961,314 B1 | 11/2005 | Quigley et al. | |
| 6,985,437 B1 | 1/2006 | Vogel | |
| 6,996,198 B2 | 2/2006 | Cvetkovic | |
| 7,035,270 B2 | 4/2006 | Moore, Jr. et al. | |
| 7,065,779 B1 | 6/2006 | Crocker et al. | |
| 7,079,571 B1 | 7/2006 | Chen | |
| 7,089,580 B1 | 8/2006 | Vogel et al. | |
| 7,116,685 B2 | 10/2006 | Brown et al. | |
| 7,127,734 B1 | 10/2006 | Amit | |
| 7,133,697 B2 | 11/2006 | Judd et al. | |
| 7,142,553 B1 | 11/2006 | Ojard et al. | |
| 7,146,632 B2 | 12/2006 | Miller | |
| 7,149,220 B2 | 12/2006 | Beukema et al. | |
| 7,194,041 B2 | 3/2007 | Kadous | |
| 7,292,527 B2 | 11/2007 | Zhou et al. | |
| 7,296,083 B2 | 11/2007 | Barham et al. | |
| 7,327,754 B2 | 2/2008 | Mills et al. | |
| 7,372,853 B2 | 5/2008 | Sharma et al. | |
| 7,460,543 B2 | 12/2008 | Malik et al. | |
| 7,487,532 B2 | 2/2009 | Robertson et al. | |
| 7,532,642 B1 | 5/2009 | Peacock | |
| 7,532,693 B1 | 5/2009 | Narasimhan | |
| 7,555,064 B2 | 6/2009 | Beadle | |
| 7,574,615 B2 | 8/2009 | Weng et al. | |
| 7,606,256 B2 | 10/2009 | Vitebsky et al. | |
| 7,652,527 B2 | 1/2010 | Ido et al. | |
| 7,653,164 B2 | 1/2010 | Lin et al. | |
| 7,664,065 B2 | 2/2010 | Lu | |
| 7,675,970 B2 | 3/2010 | Nemiroff et al. | |
| 7,822,060 B2 | 10/2010 | Sterenson et al. | |
| 7,860,092 B2 | 12/2010 | Yoon et al. | |
| 7,916,756 B2 | 3/2011 | Atsumi et al. | |
| 8,160,490 B2 | 4/2012 | Min et al. | |
| 8,174,999 B2 | 5/2012 | Kliger et al. | |
| 8,184,550 B2 | 5/2012 | Beck et al. | |
| 8,266,265 B2 | 9/2012 | Liu et al. | |
| 9,112,717 B2 * | 8/2015 | Klein | H04L 12/12 |
| 2001/0039660 A1 | 11/2001 | Vasilevsky et al. | |
| 2002/0010562 A1 | 1/2002 | Schleiss et al. | |
| 2002/0021465 A1 | 2/2002 | Moore et al. | |
| 2002/0041199 A1 | 4/2002 | Ekelund | |
| 2002/0059623 A1 | 5/2002 | Rodriguez et al. | |
| 2002/0059634 A1 | 5/2002 | Terry et al. | |
| 2002/0069417 A1 | 6/2002 | Kliger et al. | |
| 2002/0078247 A1 | 6/2002 | Lu et al. | |
| 2002/0078249 A1 | 6/2002 | Lu et al. | |
| 2002/0097821 A1 | 7/2002 | Hebron et al. | |
| 2002/0105970 A1 | 8/2002 | Shvodian | |
| 2002/0136231 A1 | 9/2002 | Leatherbury et al. | |
| 2002/0141347 A1 | 10/2002 | Harp et al. | |
| 2002/0150155 A1 | 10/2002 | Florentin et al. | |
| 2002/0166124 A1 | 11/2002 | Gurantz et al. | |
| 2002/0174423 A1 | 11/2002 | Fifield et al. | |
| 2002/0194605 A1 | 12/2002 | Cohen et al. | |
| 2003/0013453 A1 | 1/2003 | Lavaud et al. | |
| 2003/0016751 A1 | 1/2003 | Vetro et al. | |
| 2003/0022683 A1 | 1/2003 | Beckmann et al. | |
| 2003/0060207 A1 | 3/2003 | Sugaya et al. | |

(56) References Cited

U.S. PATENT DOCUMENTS

| | | |
|---|---|---|
| 2003/0063563 A1 | 4/2003 | Kowalski |
| 2003/0066082 A1 | 4/2003 | Kliger et al. |
| 2003/0073438 A1 | 4/2003 | Fukushima et al. |
| 2003/0099253 A1 | 5/2003 | Kim |
| 2003/0152059 A1 | 8/2003 | Odman |
| 2003/0165142 A1 | 9/2003 | Mills et al. |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger et al. |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0059400 A1 | 3/2006 | Clark et al. |
| 2006/0062250 A1 | 3/2006 | Payne |
| 2006/0068708 A1 | 3/2006 | Dessert et al. |
| 2006/0078001 A1 | 4/2006 | Chandra et al. |
| 2006/0104201 A1 | 5/2006 | Sundberg et al. |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0040947 A1 | 2/2007 | Koga |
| 2007/0064720 A1 | 3/2007 | Sterenson et al. |
| 2007/0127373 A1 | 6/2007 | Ho et al. |
| 2007/0160213 A1 | 7/2007 | Un et al. |
| 2007/0171919 A1 | 7/2007 | Godman et al. |
| 2007/0183786 A1 | 8/2007 | Hinosugi et al. |
| 2007/0206551 A1 | 9/2007 | Moorti et al. |
| 2007/0217436 A1 | 9/2007 | Markley et al. |
| 2007/0253379 A1 | 11/2007 | Kumar et al. |
| 2007/0286121 A1 | 12/2007 | Kolakowski et al. |
| 2008/0037487 A1 | 2/2008 | Li et al. |
| 2008/0037589 A1 | 2/2008 | Kliger et al. |
| 2008/0080369 A1 | 4/2008 | Sumioka et al. |
| 2008/0089268 A1 | 4/2008 | Kinder et al. |
| 2008/0117919 A1 | 5/2008 | Kliger et al. |
| 2008/0117929 A1 | 5/2008 | Kliger et al. |
| 2008/0130779 A1 | 6/2008 | Levi et al. |
| 2008/0162770 A1 | 7/2008 | Titiano et al. |
| 2008/0178229 A1 | 7/2008 | Kliger et al. |
| 2008/0189431 A1 | 8/2008 | Hyslop et al. |
| 2008/0225832 A1 | 9/2008 | Kaplan et al. |
| 2008/0238016 A1 | 10/2008 | Chen et al. |
| 2008/0250133 A1 | 10/2008 | Lee et al. |
| 2008/0259957 A1 | 10/2008 | Kliger et al. |
| 2008/0271094 A1 | 10/2008 | Kliger et al. |
| 2008/0273591 A1 | 11/2008 | Brooks et al. |
| 2008/0279219 A1 | 11/2008 | Wu et al. |
| 2008/0298241 A1 | 12/2008 | Ohana et al. |
| 2009/0010263 A1 | 1/2009 | Ma et al. |
| 2009/0063878 A1 | 3/2009 | Schmidt et al. |
| 2009/0092154 A1 | 4/2009 | Malik et al. |
| 2009/0106801 A1 | 4/2009 | Horii |
| 2009/0122901 A1 | 5/2009 | Choi et al. |
| 2009/0165070 A1 | 6/2009 | McMullin et al. |
| 2009/0204837 A1 | 8/2009 | Raval et al. |
| 2009/0217325 A1 | 8/2009 | Kliger et al. |
| 2009/0252172 A1 | 10/2009 | Hare |
| 2009/0254794 A1 | 10/2009 | Malik et al. |
| 2009/0257483 A1 | 10/2009 | French et al. |
| 2009/0279643 A1 | 11/2009 | Shusterman |
| 2009/0285212 A1 | 11/2009 | Chu et al. |
| 2009/0296578 A1 | 12/2009 | Bernard et al. |
| 2009/0316589 A1 | 12/2009 | Shafeeu |
| 2010/0031297 A1 | 2/2010 | Klein et al. |
| 2010/0080312 A1 | 4/2010 | Moffatt et al. |
| 2010/0142378 A1 | 6/2010 | Matheney et al. |
| 2010/0142540 A1 | 6/2010 | Matheney et al. |
| 2010/0146616 A1 | 6/2010 | Garrett et al. |
| 2010/0150016 A1 | 6/2010 | Barr |
| 2010/0158013 A1 | 6/2010 | Kliger et al. |
| 2010/0158015 A1 | 6/2010 | Wu |
| 2010/0158021 A1 | 6/2010 | Kliger et al. |
| 2010/0158022 A1 | 6/2010 | Kliger et al. |
| 2010/0162329 A1 | 6/2010 | Ford et al. |
| 2010/0174824 A1 | 7/2010 | Aloni et al. |
| 2010/0180171 A1 | 7/2010 | Liu et al. |
| 2010/0185731 A1 | 7/2010 | Wu |
| 2010/0185759 A1 | 7/2010 | Wu |
| 2010/0214916 A1 | 8/2010 | Wu et al. |
| 2010/0238932 A1 | 9/2010 | Kliger et al. |
| 2010/0246586 A1 | 9/2010 | Ohana et al. |
| 2010/0254278 A1 | 10/2010 | Kliger et al. |
| 2010/0254402 A1 | 10/2010 | Kliger et al. |
| 2010/0281195 A1 | 11/2010 | Daniel et al. |
| 2010/0284474 A1 | 11/2010 | Kliger et al. |
| 2010/0290461 A1 | 11/2010 | Kliger et al. |
| 2010/0322134 A1 | 12/2010 | Wu |
| 2011/0001833 A1 | 1/2011 | Grinkemeyer et al. |
| 2011/0013633 A1 | 1/2011 | Klein et al. |
| 2011/0080850 A1 | 4/2011 | Klein et al. |
| 2011/0205891 A1 | 8/2011 | Kliger et al. |
| 2011/0206042 A1 | 8/2011 | Tarrab et al. |
| 2011/0310907 A1 | 12/2011 | Klein et al. |

FOREIGN PATENT DOCUMENTS

| | | |
|---|---|---|
| CN | 1703871 A | 11/2005 |
| EP | 0385695 A2 | 9/1990 |
| EP | 0622926 A2 | 11/1994 |
| EP | 1501326 A1 | 1/2005 |
| JP | 60160231 A | 8/1985 |
| TW | 200824326 A | 6/2008 |
| WO | WO-98/27748 A2 | 6/1998 |
| WO | WO-98/31133 A2 | 7/1998 |
| WO | WO-99/35753 A2 | 7/1999 |
| WO | WO-99/46734 A1 | 9/1999 |
| WO | WO-00/31725 A1 | 6/2000 |
| WO | WO-00/55843 A1 | 9/2000 |
| WO | WO-01/80030 A1 | 10/2001 |
| WO | WO-02/19623 A2 | 3/2002 |

OTHER PUBLICATIONS

"Microtune Introduces Industry's First 1-GHz Cable Tuners Compatible with MoCA—Home Networking Standard," Business Wire, Mar. 2007.

Ovadia, "Home Networking on Coax for Video and Multimedia, Overview for IEEE 802.1AVB," May 2007.

Ovadia, "MoCA: Ubiquitous Multimedia Networking in the Home," Proceedings of the SPIE, International Society for Optical Engineering, 2007, http://spiedl.aip.org/getpdf/serylet/getPDFServlet?filetype=pdf&id=PSISDG00677600000167760C00000&idtype=cvips&prog=normal.

* cited by examiner

SYSTEMS AND METHODS FOR PROVIDING POWER MANAGEMENT

CROSS-REFERENCE TO RELATED APPLICATIONS

This application is a continuation of U.S. patent application Ser. No. 12/511,165, filed on Jul. 29, 2009, entitled "Systems and Methods for Providing a MoCA Power Management Strategy," which in turn claims priority from U.S. Provisional Patent Application No. 61/085,096, filed Jul. 31, 2008, entitled "Systems and Methods for Providing a MoCA Power Management Strategy" and U.S. Provisional Patent Application No. 61/187,616, filed on Jun. 16, 2009, entitled "MoCA Power Management," each of which is hereby incorporated by reference in its entirety for all purposes.

FIELD OF TECHNOLOGY

The present disclosure relates generally to information networks and, in particular, to systems and methods for providing power management.

BACKGROUND

Home network technologies using coax are known generally. The Multimedia over Coax Alliance (MoCA™), at its website mocalliance.org, provides an example of a suitable specification (MoCA 1.1) for networking of digital video and entertainment through existing coaxial cable in the home which has been distributed to an open membership.

Home networking over coax taps into the vast amounts of unused bandwidth available on the in-home coax. More than 70% of homes in the United States have coax already installed in the home infrastructure. Many have existing coax in one or more primary entertainment consumption locations such as family rooms, media rooms and master bedrooms—ideal for deploying networks. Home networking technology allows homeowners to utilize this infrastructure as a networking system and to deliver other entertainment and information programming with high QoS (Quality of Service).

The technology underlying home networking over coax provides high speed (270 mbps), high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Home networking over coax can also be used as a backbone for multiple wireless access points used to extend the reach of wireless network throughout a consumer's entire home.

Home networking over coax provides a consistent, high throughput, high quality connection through the existing coaxial cables to the places where the video devices currently reside in the home. Home networking over coax provides a primary link for digital entertainment, and may also act in concert with other wired and wireless networks to extend the entertainment experience throughout the home.

Currently, home networking over coax works with access technologies such as ADSL and VDSL services or Fiber to the Home (FTTH), that typically enter the home on a twisted pair or on an optical fiber, operating in a frequency band from a few hundred kilohertz to 8.5 MHz for ADSL and 12 Mhz for VDSL. As services reach the home via xDSL or FTTH, they may be routed via home networking over coax technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, home networking over coax type functionalities run in parallel with the cable functionalities, on different frequencies.

It would be desirable to achieve maximum power savings with MoCA devices connected by a MoCA home network.

BRIEF DESCRIPTION OF THE DRAWINGS

The objects and advantages of the subject technology will be apparent upon consideration of the following detailed description, taken in conjunction with the accompanying drawings, in which like reference characters refer to like parts throughout, and in which.

DETAILED DESCRIPTION

Figure 1:
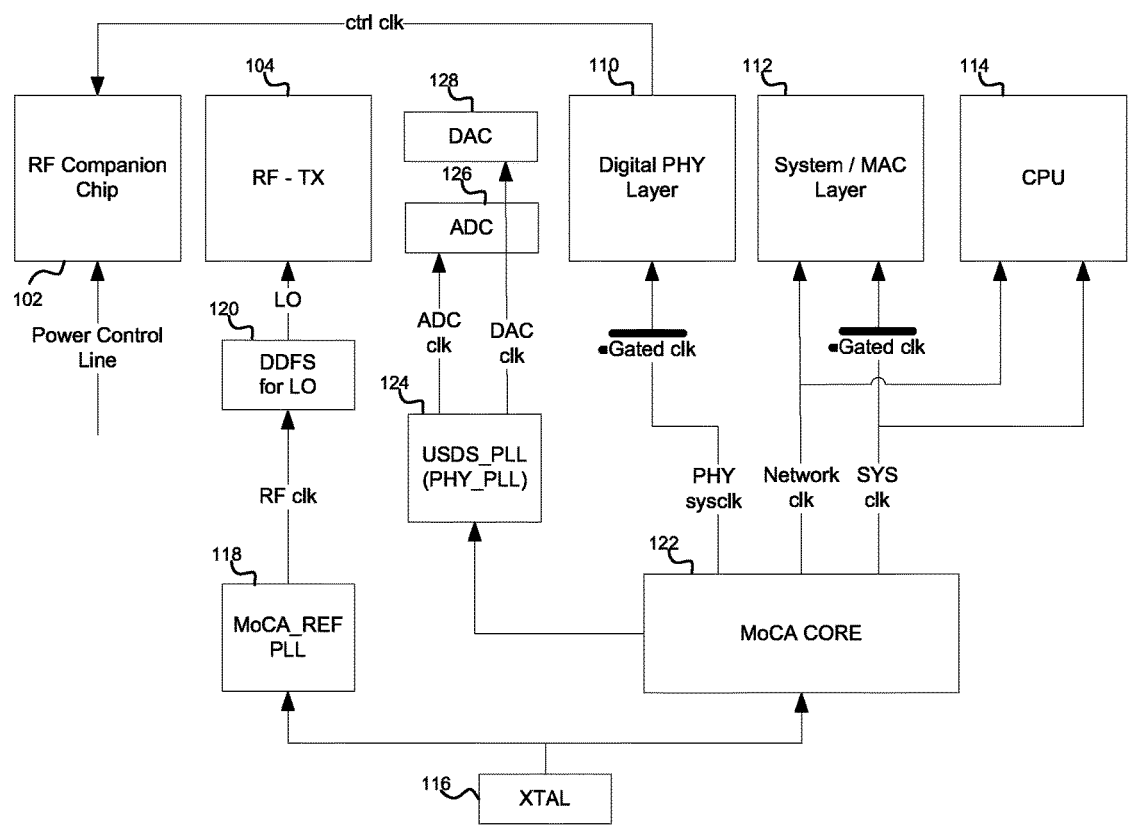
FIG. 1 shows a schematic diagram of MoCA Core blocks.

In the following description of the various embodiments, reference is made to the accompanying drawings, which form a part hereof, and in which is shown by way of illustration various embodiments in which the subject technology may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

In addition, various signals representing data or events as described herein may be transferred between a source and a destination in the form of electromagnetic waves traveling through signal-conducting media such as metal wires, optical fibers, and/or wireless transmission media (e.g., air and/or space).

The specification describes a method for providing power management. In one or more implementations, the specification describes a method to achieve a power saving mode of MoCA devices that can work together with the current MoCA 1.1 specifications and a suitable power-out saving MoCA protocol. The subject technology may provide a protocol whereby a MoCA-based device may be placed in standby state. The standby state can reduce power consumption of the device while allowing the device to be substantially instantaneously reactivated either locally—i.e., on the front panel of the set top box or remote IR—or remotely— i.e., from a different networked device within the home. The remote reactivation may occur over the MoCA network.

For ease of reference, the following glossary provides definitions for the various abbreviations and notations used in this patent application:

ARP Address Resolution Protocol
digital PHY Includes port of the MoCA integrated circuit that forms a conduit for signals to and from a receiver and/or transceiver integrated circuit
EN MoCA Existing Node (the term "node" may be referred to alternatively herein as a "module")
IE Information Element
IPV4 IP Version 4
IPV6 IP Version 6
MAC Media Access Controller—includes logic for MoCA integrated circuit that schedules opening and closing of the digital PHY as needed for transmission and/or receiving signals from the receiver and/or transceiver integrated circuit
MAP Media Access Plan
NC MoCA Network Controller
NN MoCA New Node
PD Power Down
PHY Physical Layer of MoCA Network
PS Power Saving
PU Power Up
RO Reservation Request Opportunity
RR Reservation Request Message
STB Set Top Box
SV Standby Vector
WoM Wake on MoCA Several organizations, among them the EC (European Commission) and Energy Star organization in the US, provide recommendations to reduce total energy consumption in homes. Among other devices, STBs, digital TVs and other video/networking devices are considered in the recommendations.

Networked devices, like networked STBs, should preferably maintain their network in a "live" state even when in a power saving mode in order to enable waking up of remote nodes. This is commonly referred to as Wake on LAN. Both Energy Star and the EC provide recommendations for networked devices that are in standby state but need to maintain their network connection ON.

Currently Wake on LAN (WoL) is specified for Ethernet and is being considered for WiFi. As MoCA becomes a prevailing home network platform that connects consumer electronics devices, a Wake on MoCA feature is much desired. While the current MoCA 1.1 specifications lack any definition of power saving, it is possible to achieve significant power saving according to the subject technology while maintaining MoCA network connectivity ON in standby state.

The following overview relates to power saving mode requirements related to MoCA, current power consumption of the MoCA core, and systems and techniques for power saving operating modes that are associated with EC CoC and Energy Star recommended standby states. Techniques according to the subject technology for power saving comply with MoCA 1.1. Techniques according to the subject technology are applicable to a network where nodes are configurable in standby states according to the subject technology. Such configurable nodes may coexist with other MoCA 1.1 nodes. Such networks, according to the subject technology, may also include networks comprising only nodes according to the subject technology. Efficient power saving modes according to the subject technology that may operate on top of the current MoCA specifications; and wake on MoCA protocol considerations according to the subject technology are also set forth herein.

A summary of preferable requirements for a MoCA standby state according to the subject technology may include the following:

1. Significant power reduction as compared to running—i.e., active, non-standby—state;
2. Maintaining network connectivity with remote MoCA nodes in power saving modes;
3. Node in standby state should remain a MoCA "Active" node, as defined later in the portion of the specification relating to Wake on MoCA implementations;
4. Supporting coexistence of running and standby nodes on a MoCA network;
5. Configuring a node to be in standby state when coexisting with other MoCA manufacturer implementations; and
6. Allocating active and idle times to increase power consumption savings (as discussed in more detail below in the portion of the specification corresponding to FIG. 6).

The following section outlines power saving states and their corresponding power consumption specifications for the MoCA core.

Power Management Specifications

This section summarizes power requirements. See also, MoCA & Power management—by Olivier Harel, which is available http://twiki-01.broadcom.com/bin/view/Chiparch/MoCAPowerManagement, which is incorporated by reference herein in its entirety, for a more detailed description of EC CoC and Energy Star requirements.

Standby States and Power Targets

The EC recommends two standby states for consumer electronics devices and their corresponding power goals: 1) Passive standby state—currently allows 2 Watts ("W") Alternating Current ("AC") per set top box, but plans to reduce power to 1 W AC in the near future ("Aggressive standby state"). EC CoC does not require network connectivity in passive standby state but some European countries do require maintaining it. 2) Active standby state—Requires maintaining network connectivity between the networked devices. The power requirement is 3 W AC per set top box.

Energy Star defines a single standby state. Energy Star recommendations are directed to total annual energy consumption of the box, assuming that more than 50% of the time it is on standby state. There are no specific recommendations for the power consumption on standby. However, larger power consumption is allowed for the running mode. Harel assumes 3 W AC per box for Energy Star standby state.

Certain assumptions regarding selected power consumption states may be as follows:

European aggressive passive standby at 1 W AC allows 300 mW for the BRCM 7420 manufactured by Broadcom Corporation of Irvine, Calif. The only consumption allowed to the MoCA Core consumption is standard cell leakage. The standard cell leakage may be kept low by limiting use of ("LVT") (Low Voltage Threshold) cells. Preferably all analog components should be powered down (<1 mW) and no activity of any sort is acceptable.

European passive standby state allows 2 W AC, which translates to about 1 W DC for a Set-top box.

Energy Star (USA) ES assumes that a set top box would achieve 3 W (AC) in standby; and this translates to just over 1.5 W DC (with OK or other suitable converters) for the entire set-top box.

MoCA Standby Power Requirements in Harel

The allowed overall BRCM 7420 standby power consumption and the implied allowed power consumption for a MoCA chip (when working together with the BRCM 3450, manufactured by Broadcom Corporation of Irvine, Calif., the companion LNA/PA RF (Low Noise Amplifier/Power Amplifier) (Radio Frequency transmission chip)), are depicted in Table 1 below.

The analysis set forth in Table 1 assumes that apart from MoCA, refresh DDR (Double Data Rate) and the Ethernet subsystem interfacing with the MoCA core are ON, the latter consuming between 500 to 600 mW. In the standby state set forth in Table 1, MoCA is linked up to the Ethernet subsystem but is mostly in idle mode. Some embodiments of the subject technology may include reducing the power consumption of the Ethernet subsystem by awakening it only in response to an interrupt signal generated by the MoCA core applying the filtering according to the subject technology, described in more detail below.

TABLE 1

RF Block Power Consumption

| Power State | Recommended AC target (W) | 7420 inc. MoCA (W) | MoCA core + 3450 (mW) |
|---|---|---|---|
| Active standby | 3 | 1.5 | 800-900 |
| Passive standby | 2 | 1 | 300-400 |
| Aggressive passive standby (EC CoC) | 1 | 0.3 | Only leakage |

Table 2 shows MoCA Network Status Standby configurations according to the subject technology.

In standby state, active mode, the MoCA network should typically stay ON although no data are transmitted—but the link should be maintained. In idle standby mode, keeping the network ON is not mandatory but it is desirable. In aggressive idle mode, the network is OFF and the MoCA core is powered down.

Typically, the MoCA node is toggled between running state and standby state in response to a signal external to the node. The MoCA node is toggled between different standby modes in response to a trigger signal internal to the node.

TABLE 2

MoCA Network Status in Power States

| Standby Power State | MoCA Network |
|---|---|
| Active mode | Link up, no transmit data - Required |
| Passive mode | Link up, no transmit data - Preferable |
| Aggressive passive mode (EC CoC) (also referred to herein, in the alternative, as powered-down) | Link down, MoCA is powered down |

In some embodiments, wake up time (time to resume data transmission/reception operation from MoCA standby state in idle mode) should preferably be kept under 20 milliseconds and most preferably under about 10 milliseconds.

Required wakeup time from power down is typically longer than wake up time from standby state. Wakeup time from power down typically requires the node to be re-admitted to the network. Assuming no channel search is required, the readmission should not take longer than 2 seconds.

As only leakage power is allowed on aggressive passive standby, rebooting the MoCA core may be required. Rebooting typically adds 75 milliseconds to the power-up time.

MoCA Core Power Consumption

This section relates to power consumption of the main power consuming blocks of the MoCA core. Overall power consumption reduction according to the subject technology in several operating modes is analyzed.

The section illustrates the amount of power saving that can be obtained by improving power consumption and (Power Up/Power Down) "PU/PD" times of the various blocks.

FIG. 1 shows a schematic diagram of circuitry blocks that consume power in a MoCA integrated circuit ("chip"). The circuit shown in FIG. 1 may or may not be integrated with another integrated circuit. Block 102 shows that an exemplary Broadcom 3450 chip, manufactured by Broadcom Corporation of Irvine, Calif. may be used in conjunction with the MoCA integrated circuit described herein. In some embodiments, the Broadcom 3450 chip may receive a clock signal and/or receive a power control line signal for powering down. Block 104 shows transmitting a local oscillator signal from a direct digital frequency synthesizer 120. Direct digital frequency synthesizer 120 receives a MoCA REF PLL 118 (MoCA Reference Phase Lock Loop Signal) from an external clock signal generator 116.

External clock signal generator 116 also provides a clock signal to MoCA Core 122 that preferably runs continuously as it generates the MoCA network clock.

MoCA Core 122 provides a PHY sysclk (system clock) to the digital PHY 110 (Physical Layer of the MoCA device), a network clock to System/MAC 112 and a SYS clk to the CPU 114 (which is the processor for the MoCA core.) CPU 114 may be implemented as a MIPS or other suitable processor.

MoCA Core 122 may also provide a signal to USDS_PLL (PHY_PLL) 124 (the PHY phase lock loop) which, in turn, may provide clock signals to an analog-to-digital converter circuit 126 and a digital-to-analog converter circuit 128. While legacy MoCA specifications did not allow analog-to-digital converter circuit 126 and digital-to-analog converter circuit 128 to toggle because of shut-down times, shortened ADC/DAC power up/power down times in MoCA 2.0 preferably allows for the toggling of analog-to-digital converter circuit 126 and digital-to-analog converter circuit 128 in order to save power, as necessary.

In certain embodiments according to the subject technology, in order to save power but maintain the MoCA module connected to the network, the network clock generated by chip 122 and a network timer located in system/MAC 112 may be maintained in an ON state. However, the gated clock to digital PHY 110 and the gated clock to System/MAC 112 may be selectively turned OFF, which, in turn, powers down digital PHY 110 and System/MAC 112. Accordingly, substantial power may be saved by only selectively providing the network clock to digital PHY 110 and to System/MAC 112.

The network timer (typically programmed by software) provides a signal to CPU 114. The timer receives the network clock signal from chip 122. When the timer expires, the timer can reactivate CPU 114 by waking up the CPU 114 with an interrupt signal.

Preferably, because MoCA is a coordinated network, the timing of future events is deterministic—i.e., the timing of at least one MAP cycle into the future and at least one Beacon (ten MAP cycles) into the future may be known. Therefore, different blocks can be activated ahead of time so that they can be ready to transmit at known points in time.

For example, if a MoCA core is aware that it will receive a transmission at time t, it can reactivate the necessary blocks at time t minus delta, where the delta is the time needed to resynchronize to the network clock.

Table 3 depicts the RF power consumption of a selection of the blocks shown in FIG. 1 according to the subject technology in various modes.

TABLE 3

RF Block Power Consumption

|  | RF | LO | REF PLL | 3450 |
|---|---|---|---|---|
| Power (mW) | | | | |
| TX mode | 420 | 300 | 120 | 1000 |
| RX mode | 450 | 300 | 120 | 600 |
| Power Down mode | <1 | <1 | <1 | <1 |
| Timing (microseconds) | | | | |
| Power Up | 0.5 | 40 | 4 | 0.5 |
| Power Down | 0.5 | 40 | 4 | 0.5 |

Switching times of LO and PLL in Table 3 assume that the PLL has already been synchronized; otherwise PLL acquisition typically adds another 1 millisecond.

In running state, power consumption of transmission/receiving ("TX/RX") depends on the actual data transmissions. When no data is transmitted or received, the RF parts can preferably be maintained in Power Down mode. However, due to the long LO switching times, PLL/LO should be kept ON during normal operations.

In standby state, switch transmission/receptions are adapted for intervals that are preferably long enough to enable the LO/PLL to be powered down.

Table 4 depicts the Analog-to-Digital Converter/Digital-to-Analog Converter ("ADC/DAC") power estimations in various modes.

TABLE 4

Converters Block Power Consumption

| Power m(W) | RX (ADC) | TX (DAC) | USDS PLL [NEED DEFINITION] |
|---|---|---|---|
| TX mode | 226 | 153 | 120 |
| RX mode | 426 | <1 | 120 |
| Power-down mode | 0.7 | <1 | TBD |
| Timing (microseconds) | RX (ADC) | TX (DAC) | USDS PLL |
| Power Up | 0.5 (from standby) 1000 (from PD) | .05 | 40 |
| Power Down | Application Dependent | .05 | 40 |

In certain embodiments, setting the ADC and/or the DAC in Power Down mode may be prevented by their relatively long Power Up time. In other embodiments, when the ADC/DAC has relatively shortened (toggle) power transition time, the ADC and/or DAC may be toggled to save power.

Table 5 depicts the ADC digital power estimations in various modes

TABLE 5

MoCA digital Block Power Consumption

|  | CPU | System/MAC | PHY |
|---|---|---|---|
| Power m(W) | | | |
| Normal Mode | 100 | 400 | 400 |
| Clock Only | 50 | 200 | 200 |
| Clock Gated | 10 | 10 | 10 |
| Timing (microseconds) | | | |
| Power Up | <1 | <1 | <1 |

In running state, MoCA logic is active. In a clock only node—logic is not active but clock is not gated. In a gated clock node—power consumption is mainly due to leakage power. To estimate the CPU power consumption in gated clock mode, it is assumed that the CPU enters a WAIT state when the node is idle. The gated clock may preferably be implemented for the PHY and the System/MAC blocks. It is assumed that during a standby state according to the subject technology, even in active mode, PHY and MAC will not be active so their clocks can be gated. The CPU may exit its WAIT state in response to receiving a timer interrupt.

MoCA Core Estimated Power Consumption in Normal Operation

Table 6 depicts the estimated power consumption for an existing MoCA node (EN) for two cases:

1) When no data are transmitted: When a MoCA node is in standby state, in idle mode (neither transmitting nor receiving), its expected power consumption is about 1.4 W, and could be reduced to about 1.0 W if a gated clock is applied according to the subject technology.

2) Maximal traffic load: MoCA is expected to consume an average 2.7 W.

TABLE 6

MoCA node power consumption no gated clocks

| Power (mW) | without gated clk | | with gated clk | | with gated clk and reduced ADC current on idle | |
|---|---|---|---|---|---|---|
| | EN No TX Data | EN Full Traffic Load | EN No Data | EN Full Traffic Load | EN No Data | EN Full Traffic Load |
| RF | 614 | 1532 | 614 | 1532 | 614 | 1532 |
| ADC/DAC | 236 | 283 | 236 | 283 | 45 | 261 |
| Digital | 462 | 760 | 142 | 722 | 142 | 722 |
| MIPS | 58 | 95 | 24 | 91 | 24 | 91 |
| Total | 1370 | 2670 | 1016 | 2628 | 825 | 2605 |

The estimated power consumption is based on the following assumptions: a single MAP and a single control message are transmitted per MAP cycle; five RR messages are transmitted per MAP cycle (worst case); MAP cycle is 1 millisecond long; MAP, RR and Control non-data frames (MOCA network control frames) LMO, SEC, PROBE, KEY (security) all are about 52 microseconds long; when active, a node is transmitting and receiving 50% of the time; when idle, RF is powered down and clock is gated wherever it is applicable; and, in full MoCA traffic load, the node is active 90% of the time.

The MoCA 1.1 protocol allows significant power reduction when the network is ON but no data is transmitted over the network. In methods according to the subject technology, the Network Controller (NC) could increase the MAP cycle duration up to 2.5 ms, while allowing a single Reservation Request opportunity per MAP cycle. In one embodiment, preferably all nodes would be required to either receive or transmit during less than 10% of the time, while for the other 90% of the time, the RF/ADC and PHY blocks would be idle.

Power Saving Schemes According to the Subject Technology (MoCA 1.1 Compliant)

In this section, power consumption of a MoCA EN is estimated when it is in a standby state. Three levels of power saving modes are identified, according to the subject technology. Implementation of the modes may depend on interoperability requirements:

1. A MoCA 1.1 network where the NC is not a node according to the subject technology In this mode the MoCA Core acts as a node in the running state with no data to transmit or receive. The core can be on its PHY/RF idle mode about 85% of the time. When idle, the clock is gated and RF is powered down. PLLs and ADC cannot be powered down due to longer power up times.

In such a mode, the MAP cycle is assumed to be about 1 millisecond on average.

2. A MoCA network where the NC is a node according to the subject technology—in one embodiment that may be configurable in standby states according to the subject technology—but ENs can be either nodes according to the subject technology or other conventional nodes In this mode the NC can adapt the MAP cycle to network activity by increasing MAP cycle duration (up to 2.5 milliseconds allowed by the MoCA specifications) and lowering the periodicity of the ROs to a single RO per MAP CYCLE for nodes according to the subject technology that are in standby state (can be even lower when only nodes according to the subject technology are on the network). When the NC discovers activity on the network it can return to level 1.

In this mode, when no data is transmitted over the network, ENs could leave idle mode once in 2.5 milliseconds, PLLs and RFs are powered down in addition to gating the clock. The ADC cannot be powered down except when its power up time has improved significantly.

This mode is preferably fully compliant with the MoCA 1.1 and can interoperate with conventional nodes. However, when conventional nodes are admitted on the network, the NC according to the subject technology may require more power to support them.

3. A MoCA 1.1 protocol where the NC and all nodes are nodes according to the subject technology In one embodiment of the subject technology, this mode enables the nodes according to the subject technology to be awakened only once in a predetermined time—e.g., 10 milliseconds—to further reduce power consumption. Both PLLs and ADC may preferably be powered down in this mode. A message passing method according to the subject technology, preferably compliant with MoCA 1.1 specification may be applied (see description below for more detail).

Thus, power saving can be improved by switching the RF/ADC/PHY/MAC blocks efficiently between running and standby states, and by significantly reducing power consumption of these blocks when in standby state.

Table 7 depicts estimated power consumption on each of the power saving modes, wherein "proprietary" denotes a node that may be configured according to the standby state and modes set forth in Table 2:

TABLE 7

EN Power Savings Modes

| | | | Power Consumption (mW) | | |
|---|---|---|---|---|---|
| Mode | NC | ENs | Current design | w/gated clock | w/improved ADC PD |
| 1 | Non-Proprietary | Proprietary & Non-Proprietary | 1370 | 1000 | 850 |
| 2 | Proprietary | Proprietary & Non-Proprietary | 1210 | 420 | 210 |
| 3 | Proprietary | Proprietary only | 1120 | 80 | 80 |

To simplify the discussion of the integration of the MoCA power saving, this application defines below in Table 8 four MoCA Core Power Saving states M0 to M3 that correspond to the open Advanced Configuration & Power Interface ("ACPI") specifications [4] [www.acpi.info], which is hereby incorporated by reference herein in its entirety.

TABLE 8

| MoCA Core Power State | Descriptions | Suitable to receive Wakeup Interrupt |
|---|---|---|
| M0 - Running | MoCA Core is running. Full network capabilities. Analog parts could be powered up/down on schedule. | No |
| 3M1 - Standby | MoCA Core timers only are always on. The other blocks of the MoCA Core wake up on timer interrupts to handle MoCA Control traffic only (e.g., Beacons, MAPS and RRs), to keep the MoCA Core "virtually" connected. MoCA Core filters ingress MoCA frames and asserts a Wake-up interrupt for Wake-up frames. | Yes |

TABLE 8-continued

| MoCA Core Power State | Descriptions | Suitable to receive Wakeup Interrupt |
|---|---|---|
|  | Maximum power saving if the NC node is a Broadcom node. Minimum power saving if the node is not a Broadcom node. |  |
| M3 - Down | MoCA core is powered down. No network connection. Full reboot is required to reenter the running state. | No |

Table 9 below sets forth the possible transitions from Power Saving modes and their associated commands:

TABLE 9

| | From | | |
|---|---|---|---|
| To | M0 Running State | M1 Standby (Active or Idle) | M3 Power Down |
| M0 |  | Host Request | Host Reboot |
| M1 | Host Request | — |  |
| M3 | Host Request | — |  |

This section details the embodiment for power saving techniques, according to the subject technology, in the case where the entire MoCA network includes nodes according to the subject technology. This mode is preferably MoCA 1.1 compliant; however, it may rely on proprietary messaging that runs over the MoCA 1.1 protocol.

Figure 2:
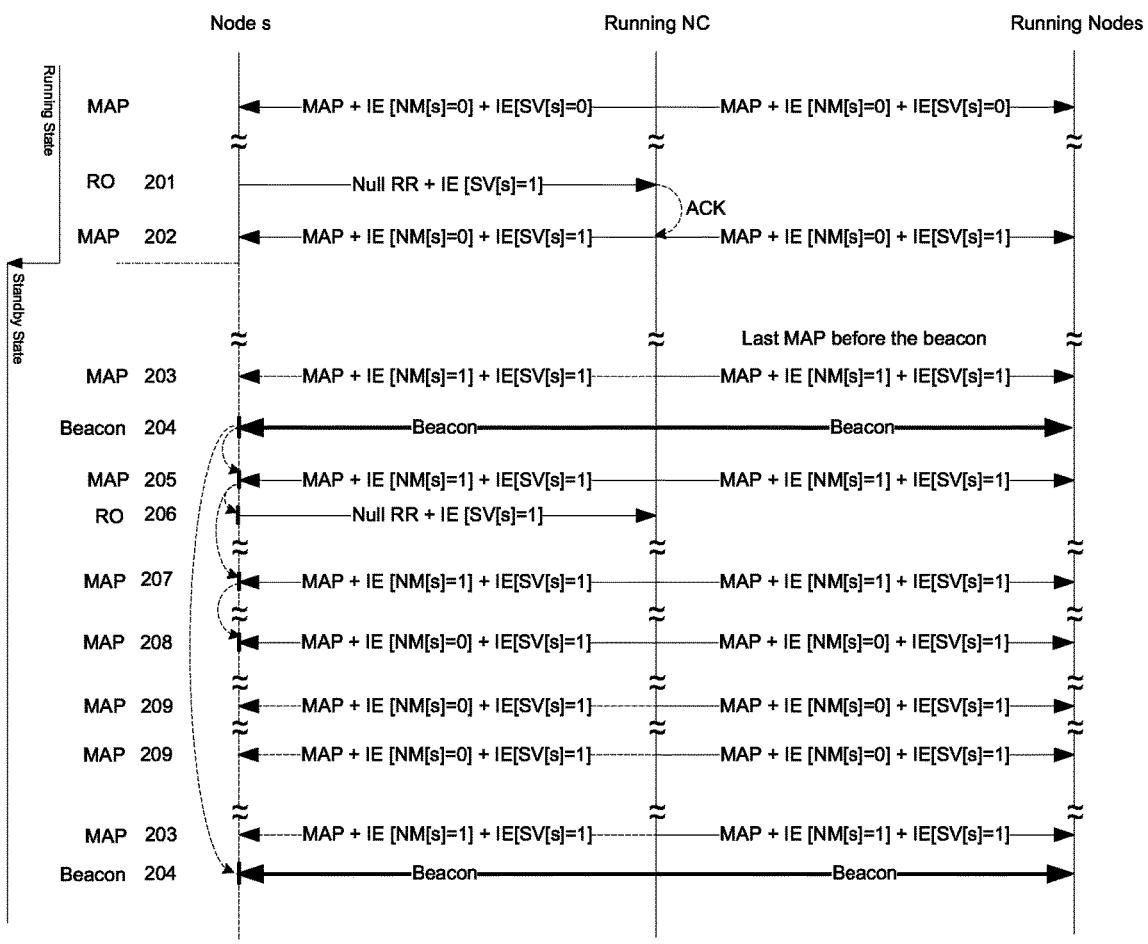
FIG. 2 shows a schematic diagram of an operational sequence of an existing MoCA node ("EN") entering standby state.

FIG. 2 shows a schematic diagram of an operational sequence of an EN entering standby state.

Step 201 shows the EN sending a request to the NC to enter standby state by asserting the bit associated with its node_ID into the Standby Vector (SV) Information Element of its Null (i.e. no transmission opportunity is requested) Reservation Request Frame.

Step 202 shows the NC acknowledging the EN's standby transition request by asserting the bit associated with the node_ID of the requester EN into the Standby Vector (SV) Information Element of the MAP frame. This is shown by the ACK message along the curved, hatched line that is adjacent the running NC line.

The NC preferably reduces the periodicity of the scheduled ROs for the suspended node to one RO per Beacon period.

Step 203 shows that, in the last MAP frame before the Beacon, the NC asserts in the Next MAP Vector (NV) Information Element all the bits associated with standby nodes. This assertion indicates to the running nodes that a transmission request to a standby node can be made in the next scheduled Request Opportunities. These transmissions can be made because Standby Nodes will preferably receive and parse the MAP frame in the next MAP cycle. The EN toggles to active mode on the next scheduled Beacon to get the scheduled time of the next MAP frame and re-enters its idle mode. Thereafter, Step 204 shows the standby node receiving the Beacon. The Beacon indicates where the first MAP will be. The standby node can receive the 1st MAP frame (Step 205) scheduled by the beacon and can parse the MAP frame.

The repeat of steps 203 and 204 shows that, if the EN misses the MAP frame, it can retry on the next Beacon cycle.

Step 206 shows that the EN may send an RR (in MoCA 2.0) after the 1$^{st}$ MAP after the Beacon even if it has no pending frame to transmit.

In step 205, the MAP parsing generates two possible scenarios: If the bit associated with the next MAP Vector (NV) is asserted, the standby node should receive the next MAP (step 207). This scenario can repeat itself until the bit associated with the Next MAP Vector (NV) is de-asserted (step 208). Once the bit associated with the next MAP Vector (NV) is de-asserted, the standby node re-enters idle mode until the next scheduled Beacon (step 204) and ignore any remaining subsequent MAPs within the current Beacon period (steps 209). The curved, hatched lines along the left side of the Node S line indicate the various points at which the standby node has been instructed to be in active standby mode.

Figure 3:
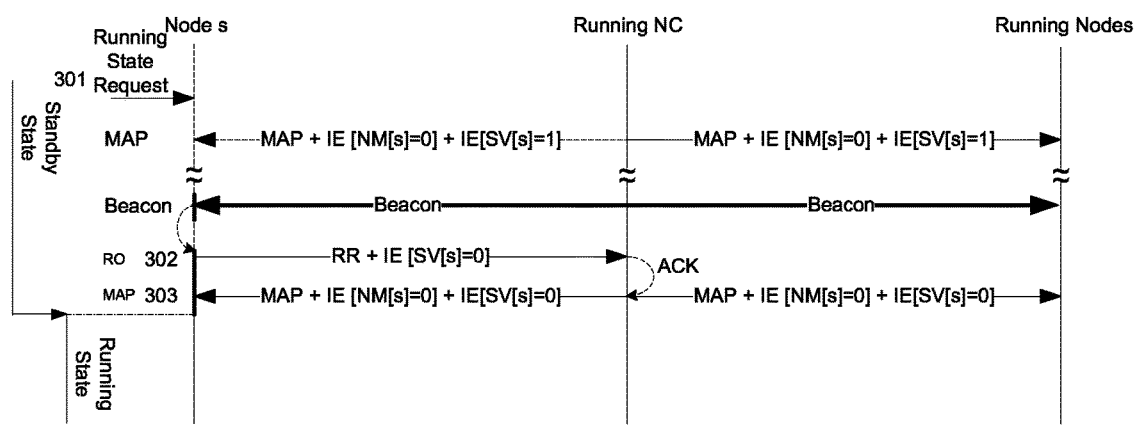
FIG. 3 shows a schematic diagram of an operational sequence of an EN re-entering running state.

FIG. 3 shows a schematic diagram of an operational sequence of an EN re-entering running state. When the system elects to send a packet over the MoCA network, the system may indicate to the MoCA Node a Standby (M1) to Running (M0) State transition.

The following description corresponds to the exemplary steps shown in FIG. 3. Step 301 shows the EN getting an M1 standing to M0 running request from an external source (the upper layer of the host entity), i.e., the system on which the node is located.

Step 302 shows the EN sending a request to the NC that the node to re-enter Running State by de-asserting the bit associated with its node_ID into the Standby Vector (SV) Information Element of its Reservation Request Frame.

Step 303 shows the NC acknowledges the EN's transition by de-asserting the bit associated with the node_ID of the requester EN into the Standby Vector (SV) Information Element of the MAP frame.

Figure 4:
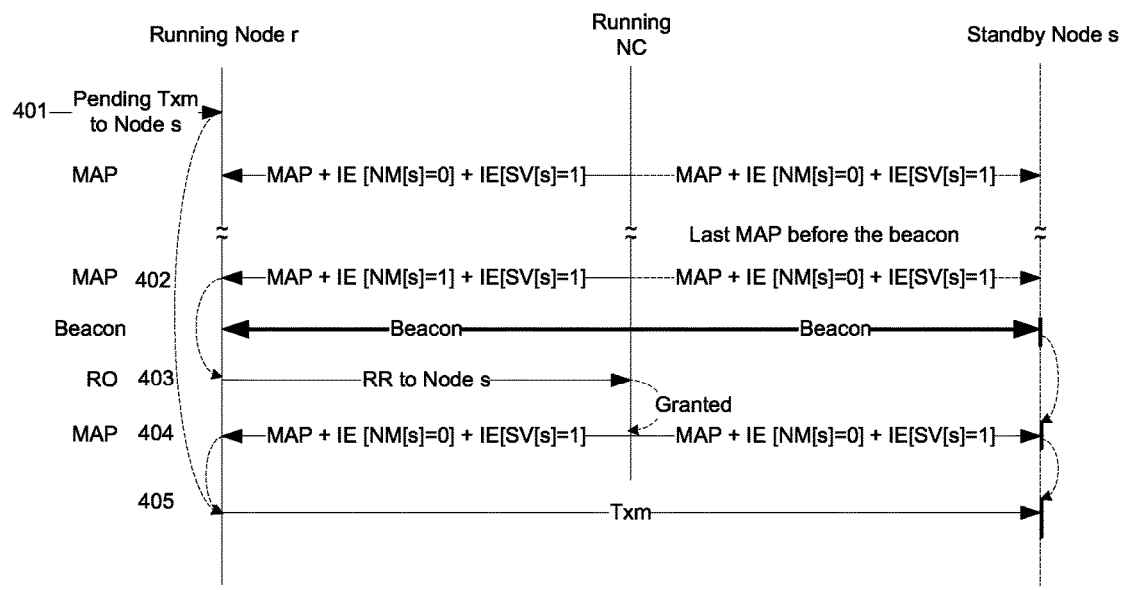
FIG. 4 shows a schematic diagram of another embodiment of an operational sequence of a transmission to an EN in standby state.

FIG. 4 shows a schematic diagram of another embodiment of an EN/NC that wants to transfer a frame to EN(s) in standby state, as shown in step 401. The following description corresponds to the exemplary steps shown in FIG. 4.

The running EN/NC is typically aware: a) which destination nodes are in Standby State (from the Standby Node Vector (SV) in MAP Frames), and b) the nature of the 802.3 frame to be transmitted—e.g., Unicast (single node recipient), Multicast (plurality of preferably selected recipients) or Broadcast (send to all nodes).

Step 402 shows that, for a MAC Unicast and/or a MAC Broadcast frame, the requesting EN(s) await(s) the assertion of the bit associated with the destination node ID in the Next MAP Vector (NV) in the MAP frame to send a Reservation Request for the pending transmission in its next scheduled RR 403.

For MAC Multicast frame, the EN can ignore standby nodes, as standby nodes are typically not members of any Multicast groups. Generally, in methods according to the subject technology, nodes de-register from any Multicast group upon transitioning to standby state.

Step 404 shows that the NC can grant the RRs in the MAP following the Beacon. If the NC cannot grant a request in the next MAP cycle, the NC may grant a request in the subsequent MAP cycle(s) by indicating to a node to receive the subsequent MAP frame(s). In one embodiment of the subject technology, the NC may provide an indication by keeping the bit associated with the destination node ID asserted in the Next MAP Vector (NV) in the MAP frame.

Step 405 shows the transmission to the node in standby node. The Standby node can toggle to active/idle modes within standby to receive any scheduled event and toggle to idle mode before scheduled events. The Beacon indicates when the MAP frame is scheduled. The standby nodes can then receive the MAP frame and parse it.

If more transmissions are pending, the NC may schedule transmissions in the MAP cycles subsequent to the first MAP following the Beacon transmission by keeping the bit associated with the recipient standby nodes asserted in the Next MAP Vector (NV) of the MAP frames.

Certain aspects of the subject technology relate to transmit and NC MoCA Node handling in a mixed MOCA network of nodes in Standby and Running states.

A running node can transmit 3 types of MAC frames: Unicast, Multicast, and Broadcast.

It should be noted that the extraction of the MAC address type of the IEEE 802.3 ingress frames is supported by the device hardware and software readable to the requester The table below lists all possible transmission cases and one embodiment according to the subject technology of their respective TX and NC handling.

TABLE 10

| Transmission Possibilities | Type | Handling |
|---|---|---|
| Unicast | MAC Unicast | Normal Tx |
| Broadcast | MAC Broadcast | Delayed Rx: (wait for Standby nodes to be active) Wait for IE NM = 1 in MAP before requesting RR for Tx |
| Multicast/ Broadcast | MAC Multicast (MoCA Broadcast) | Ignore Standby Nodes (No Multicast Members on Standby Nodes) Normal Tx |

Another aspect of the subject technology relates to an NC entering Standby State. An NC that is entering standby state should preferably initiate an NC handoff with one of the running ENs of the network. If the NC is the last running node of the network, it could enter its standby state and:
(1) extend its MAP cycle to send only one (or two to compensate time) MAP per beacon period (of every 10 ms, nominal, or of other suitable duration); and/or
(2) whenever a node on the network indicates that it re-entered its Running State, the NC can also re-enter its Running State.

Yet another aspect of the subject technology relates to a system referred to herein as "Wakeup on MoCA ('WoM')."

Table 11 describes the WoM pattern filtering of a MoCA node.

The MAC Address Resolution preferably provides translation of an IP address to a MAC address. Using IPV6, the Multicast MAC DA (Destination Address) allows the node to be virtually connected even though the node is in standby state. This protocol may be implemented by signaling the reception of a few specific network protocol frames to a system in standby state. Such signaling allows the system to wake up and answer these frames, thereby preventing their respective network or transport protocols from timing out. Such IP specific frames may include 802.3 Unicast frames, IPv4 ARP frames, and/or IPV6 IGMPv6 Network Discovery Neighbor/Router Solicitation and Update Message frames. Such a technique, according to the subject technology, preferably precludes the need for a power management proxy and/or a special protocol.

Figure 5:
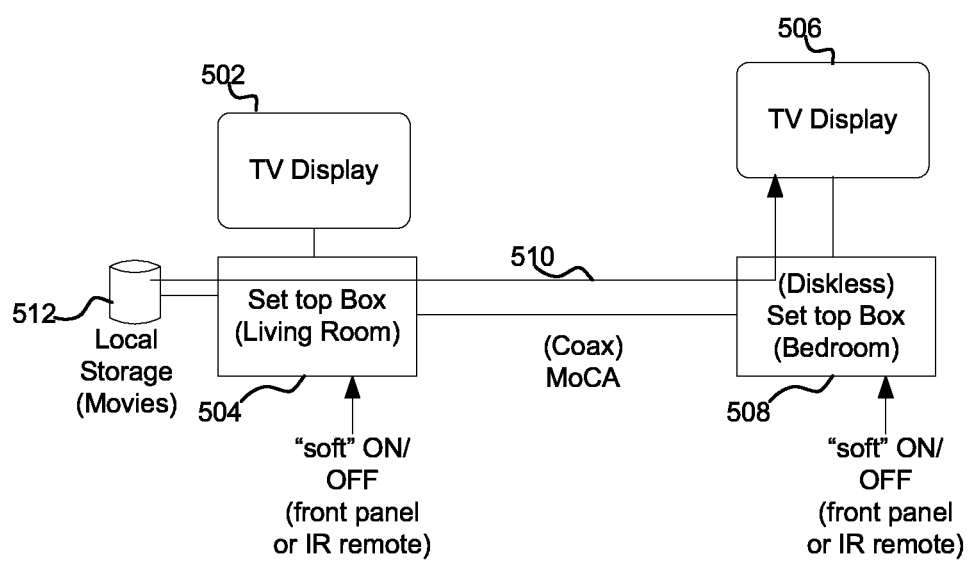
FIG. 5 shows an exemplary embodiment of a system that may use the methods described herein to reduce power consumption in a MoCA network.

FIG. 5 shows an exemplary embodiment of a system that may use the methods described herein to reduce power consumption in a MoCA network. FIG. 5 preferably includes a first TV display 502, a set top box 504, a second TV display 506 and second set top box 508. First set top box 504 and second set top box 506 may be connected by a coax network 510.

First set top box 504 includes a local storage 512. Such local storage may store movies on a hard disk or other suitable storage medium. Each of set top boxes 504 and 508 (or just first set top box 504) may be capable of a soft OFF which would place the set top box in a standby state according to the subject technology. A soft OFF button may be mounted on the front panel of the set top box or the IR remote.

In one embodiment of the subject technology, first set top box 504 may be in standby state. In this embodiment, second set top box 508 can access the hard drive on first set top box 504, for example, to play the movie stored on hard disk 512 of first set top box 504 on second TV display 506—even though first set top box 504 is in standby state.

Figure 6:
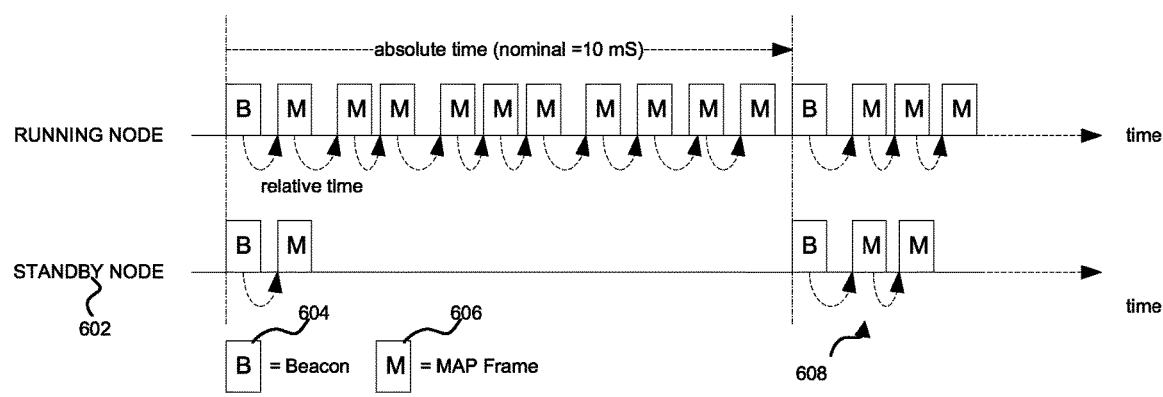
FIG. 6 shows a schematic diagram of the operation of a standby state according to one or more implementations.

FIG. 6 shows a schematic diagram of the operation of a standby state according to one or more implementations of the subject technology. FIG. 6 shows that a standby node 602 according to the subject technology may be characterized such that the set top box stays active by listening to beacons 604 and the first MAP 606 following a Beacon. The

TABLE 11

| Wake on MOCA Frame Filtering Patterns | | | |
|---|---|---|---|
| Frame type | | | WoM filtering pattern |
| MAC address resolution | IPV4 | ARP (Broadcast) | Broadcast MAC DA + ARP ETH TYPE (0x0806){(+TARGET PROTOCOL ADDRESS)} |
| | IPV6 | Neighbor Discovery PROTOCOL MESSAGES(Multicast) NEIGHBOR SOLICITATION ROUTER SOLICITATION ROUTER ADVERTISEMENT REDIRECT MSG MULTICAST | MULTICAST MAC DA BIT + IPV6 ETH TYPE (0X86DD) + IPV6 HEADER PARSING TO 1PV6 ICMP HEADER + ICMP TYPE [133 . . . 137] {(+TARGET PROTOCOL ADDRESS)} |
| Directed Frame | | | Unicast MAC DA bit |
| Magic Packet ™ | | | Broadcast MAC DA (destination address) + 0xFFFFFFFFFFFf | relative time of the next MAP may be indicated in the beacons which are sent by the Network Controller in absolute time.

The rules, according to the subject technology, associated with a standby node may be as follows. The standby node may always be listed in a predetermined MAP—e.g., the first MAP frame after a beacon—and continue to listen to subsequent MAPs, as shown at 608, as the NV vector in the MAP frames indicate. When the NV vector indicates otherwise, the standby node 602 may not listen to MAPs in the current beacon period, or other predetermined beacon period, until the first MAP of the next beacon period.

Figure 7:
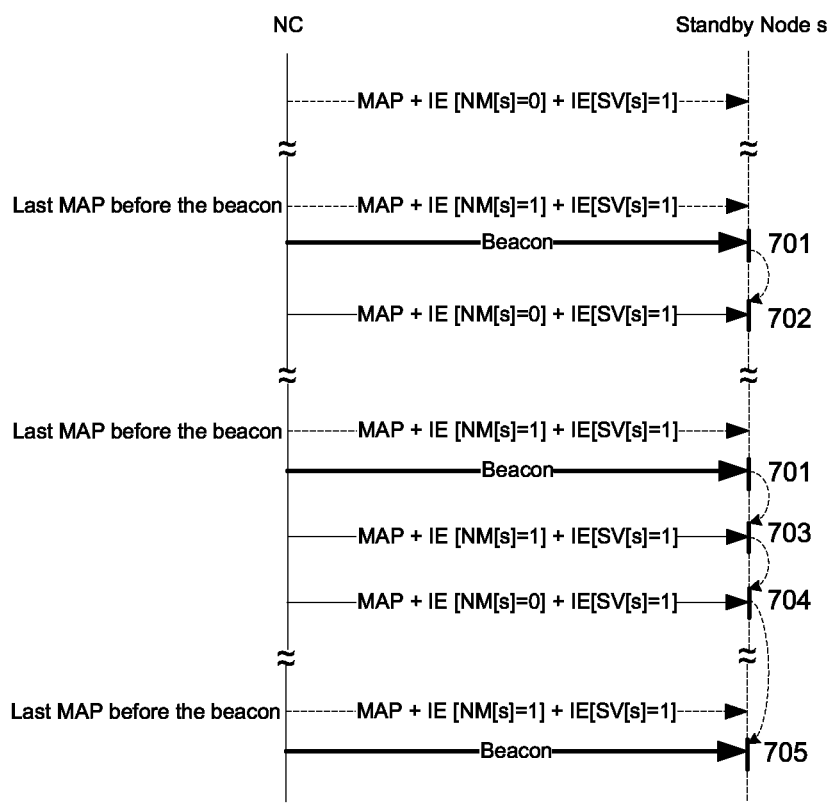
FIG. 7 showing a schematic diagram of an operational sequence of a standby node according to one or more implementations.

FIG. 7 shows another schematic diagram of an operation of a node in standby state according to one or more implementations of the subject technology. In FIG. 7, following the first beacon 701, the standby node listens to only the first MAP 702 of the beacon period. Thereafter, the standby node returns to idle mode in response to the deasserted bit in the NM vector.

Following the second beacon 701, the standby node listens to the first MAP 703 and the second MAP 704 in response to the asserted bit in the NM vector of the first MAP 703 of the second beacon period. Thereafter, the standby node returns to idle mode in response to the deasserted bit in the NM vector of the second MAP 704.

Beacon 705 is shown as well. It should be noted that every MAP before the beacon typically has the bit in the NM vector asserted in order to cause the standby node to listen to the first MAP following the vector.

The foregoing analysis assumes that, apart from MoCA, refresh DDR and the Ethernet subsystem interfacing the MoCA core are ON, the latter consuming between 500 to 600 mW. MoCA is linked up but is mostly idle. Other embodiments of the subject technology reduce the power consumption of the Ethernet subsystem by waking it in response to an interrupt generated by the MoCA core applying the filtering described above.

Preferably, the subject technology could provide for remote access over the network while in standby state without any sideband method or protocol other than TCP/IP. Systems and methods according to the subject technology may adapt MoCA-based products to be Energy Star and EC Compliant, may provide for remote management capabilities of MoCA-based products while the products are in standby state, and may provide the products with substantially instantaneous return to full functional mode from standby state.

In the MoCA 1.1 specification, a non-active node to the network is either left fully active even in case of no activity or shut down to save energy. Re-entering the network requires the full admission process which lasts several seconds.

Several organizations, among them the EC (European Commission) and Energy Star organization in the US, are writing recommendations to reduce total energy consumptions in homes. Among others, STBs, digital TVs and other Video/networking devices are considered. In particular, they include recommendations for power efficient standby states for STBs, as these devices are expected to be in a non operating state most of the time.

Networked devices, like networked STBs, should desirably maintain their network alive even when in a power saving mode, to enable waking up remote nodes. Both Energy Star and the EC provide recommendations for networked devices that are in Standby state but need to maintain their network on.

Figures 8, 9:
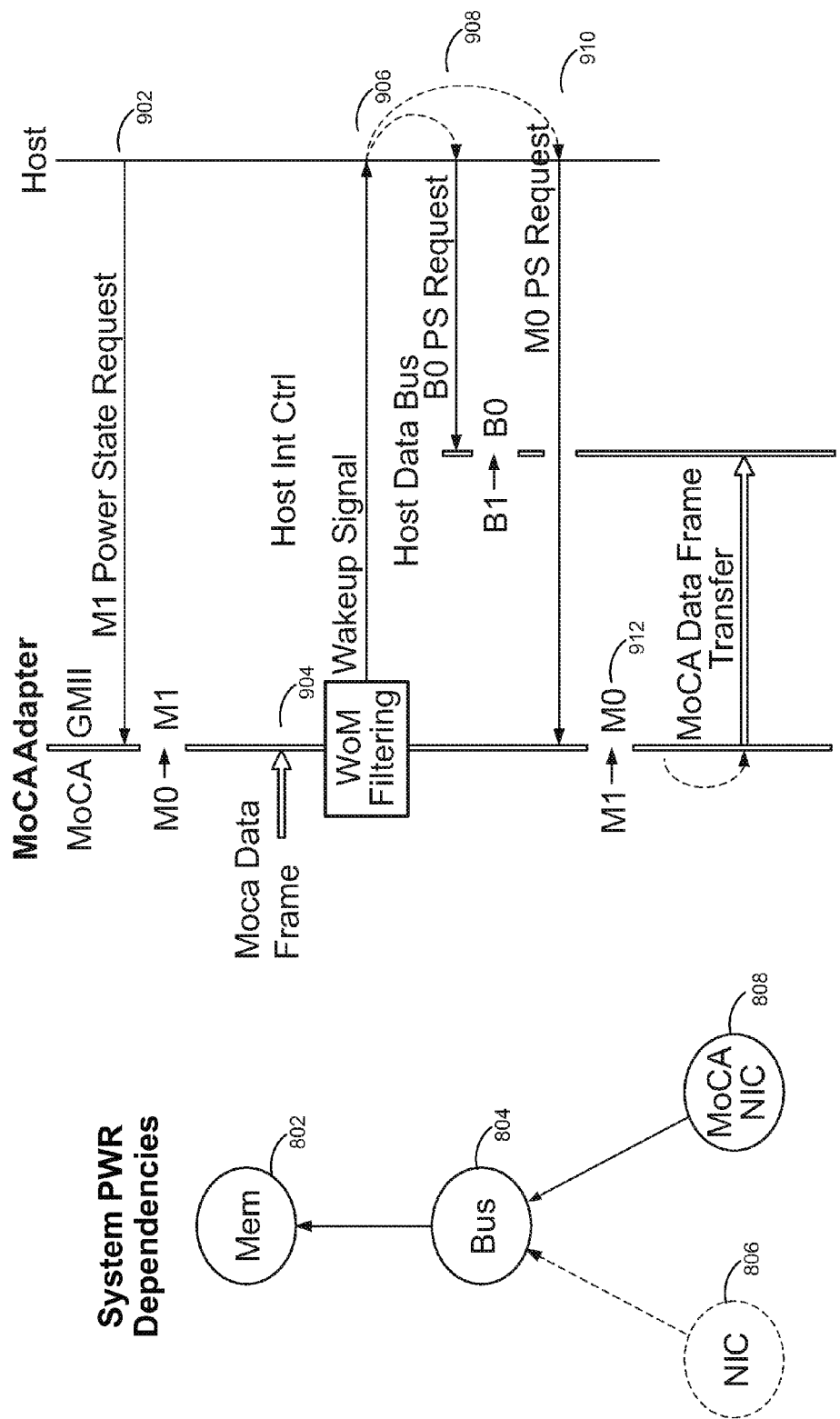
FIG. 8 shows a schematic diagram of power dependence for a network device in a system according to one or more implementations.
FIG. 9 shows a schematic diagram of a power state transition sequence according to one or more implementations.

FIG. 8 shows a schematic diagram of power dependence for a network device in a system according to one or more implementations of the subject technology. Specifically, FIG. 8 shows the coupling of a memory module 802, a bus 804, a conventional NIC (Network Interface Controller) 806 and a MoCA NIC 808 according to the subject technology. In order for the NICs 806 and/or 808 to function, the NICs need to be able to save into memory module 802 and pull from memory module 802. In addition, bus 804 should be powered in order to facilitate communication between NICs 806 and/or 808 and memory 802.

When a NIC transitions to a running state, it typically immediately begins transmitting data. Therefore, in order to transition from a standby state to a running state, memory 802 and bus 804 must first be powered up prior to the powering up of NICs 806 and/or 808.

Step 902 shows an M1 Power State request directed from a host to the MoCA adapter of the MoCA node 902. Thereafter, the WoM filtering is implemented to determine whether a wakeup signal from the host internal control is included in the Power State Request, as shown at step 904. The wakeup signal is used to indicate to the system the reception of a frame of interest for the system (a frame upper layer network protocol should handle and answer to prevent protocol time out). As a result of the wakeup signal, the system may first power the system modules needed to receive the frame retained by the MoCA device (such powering the memory, then the data bus connected to the MoCA device in order to transition from B1 to B0 state), as shown as 906 and 908. At step 910, upon completion of this sequence (based on the exemplary power dependency described in FIG. 8.), the MoCA device may be requested to re-enter from M1 to M0 power state. At step 912, the MoCA device has re-entered M0 state and could deliver the received frame to the system memory for handling by the higher layer entities.

Yet another aspect of the subject technology relates to Power Management Messages. Power Management MoCA Management Protocol ("MMP") messages according to the subject technology may be sent by the host to request the MoCA Node to transition from one Power Mode State to another. Such messages may include the following:

Running State (M0) to Sleeping State (M1);
Running State (M0) to Down State (M3); and
Sleeping State (M1) to Running State (M0).

The MoCA Core response to the transition request indicates the status of the transition. If the transition was successful within the MoCA processing core—i.e., the processing module associated with MoCA functions—the response returns a success status. Otherwise, the response can return a rejection status and the reason for the rejection.

A MoCA Wakeup frame from a host system may trigger a transition request at the MoCA core from Standby State (M1) to Running State (M0).

Figure 10:
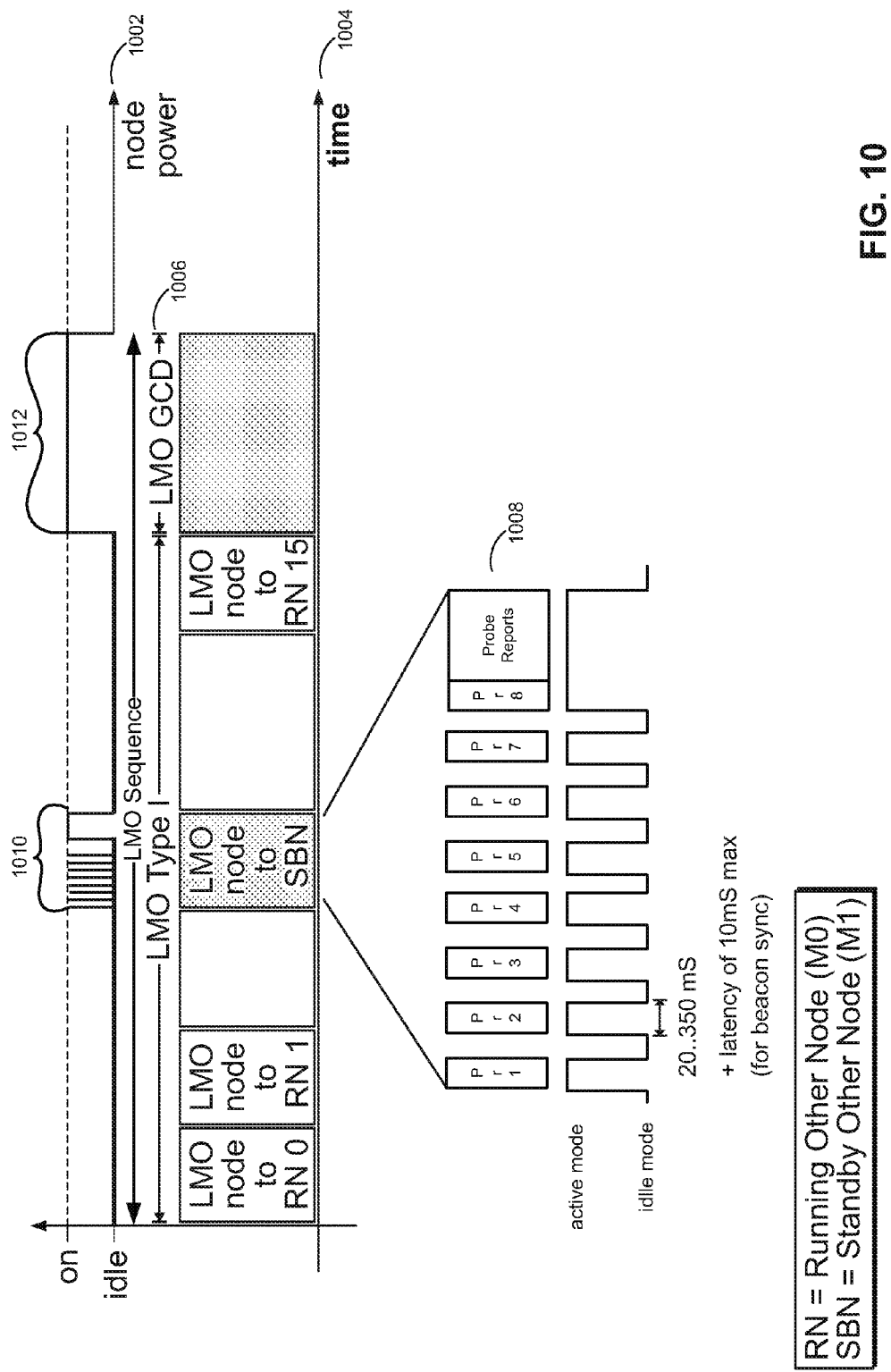
FIG. 10 shows a schematic diagram of active standby/idle standby mode transition for a MoCA node participating in a periodic Link Maintenance Operation (LMO) according to one or more implementations.

FIG. 10 shows a schematic diagram of active standby/idle standby mode transition for a MoCA node participating in a periodic Link Maintenance Operation ("LMO") according to the subject technology. Lines 1002, 1004 show the transitioning of a node in standby state as it participates in an LMO. Time line 1006 shows that, when another node has assumed the position of LMO node, the standby node only has to be in active mode for durations 1010 and 1012. It should be noted that during duration 1010, which is expanded in greater detail at 1008, standby node only has to be active for the probe periods and to provide a probe report. Putting the standby node in idle state during the latency periods can provide added power savings. The time between each probe is typically 20-350 milliseconds plus a latency of about 10 milliseconds (for beacon synchronization). Finally, the standby node should remain active during LMO GCD (the determination of Greatest Common Density period), in which scheduling the active/idle time of the standby node becomes too complex.

When the M1 node assumes the position of LMO node, then the LMO stays in active mode for the entire LMO process (toggling to idle mode may produce insignificant power saving in regard to the active/idle mode ratio during LMO node sequence).

The distance between each probe is typically 20-350 milliseconds+a latency of about 10 milliseconds (for beacon synchronization).

In certain embodiments of the subject technology, an NC can select an M1 Node to be the LMO node at reduced periodicity. For example, in a network of only two nodes, the NC can select an M1 Node at the same periodicity that exists in a full 16 node network. The Period for the LMO= (16*LMO sequence (~0.5 sec per node)+T6 (1 sec))=9 sec. When the M1 node is selected as the LMO Node, the M1 node can stay ON for the whole LMO sequence. When the M1 node is selected as an "Other Node", the M1 node can fully participate in the LMO in ON/IDLE mode to minimize power consumption. Such limited selection of the M1 node can preferably save power consumption.

2. a MAP frame by the NC to indicate to all the nodes of the MoCA network the Power State of each node. An asserted bit in the Standby Vector indicates that the node with the associated node_ID is in Standby State. A de-asserted bit indicates that the node with the associated node_ID is in Running State.

The Next MAP Vector (NV) Protocol Information Element can be added to: a MAP frame by the NC to indicate:

1. to all the running nodes of the MoCA network if reservation requests to transmit to standby nodes could be made in the next scheduled RRs. An asserted bit in the Next MAP Vector indicates that reservation to transmit to the node with the associated node_ID could be made in the next scheduled RR. A de-asserted bit indicates that reservation to transmit to the node with the associated node_ID could not be made.

2. to selected standby nodes that they should reactivate themselves in time to receive the next scheduled MAP frame. An asserted bit in the Standby Vector indicates that the node with the associated node_ID should receive the next MAP frame. A de-asserted bit indicates that the node with the associated node_ID that no more MAP frames should be received within the current Beacon Period.

Table 12 sets forth an embodiment of the Standby Vector Protocol Information Element and Next MAP Vector Protocol according to the subject technology.

TABLE 12

Standby Vector Protocol Information Element

| Field | Length | Usage |
|---|---|---|
| Protocol IE Header | | |
| | 4 bits | Pre-determined value to determine which frame type |
| | 4 bits | Pre-determined value to determine which frame type |
| | 6 bits | 1 |
| | 2 bits | Type III |
| Protocol IE Payload | | |
| | 16 bits | Bitmask. Each bit of the bitmask is associated with a node ID - LSB is node 0. Bit_i = 1: in MAP: Node_i is in standby state in RR: transition to standby state request Bit_i = 0: in MAP: Node_i is in running state in RR: transition to running state request |
| | 16 bits | For Running State: Indicates sending an RR in the next MAP cycle For Standby: Indicates where to stay awake for the next MAP Bitmask. Each bit of the bitmask is associated with a node_ID - LSB is node 0. This Vector is meaningful only for the nodes set in Standby Node Vector Bit_i = 1: Indicates that RR allocated to Node i may be requested in the next MAP cycle Bit_i = 0: Indicates that RR allocated to Node i should not be requested in the next MAP cycle |

Yet another aspect of the subject technology relates to Power Management Protocol Information Elements. The Standby Vector (SV) Protocol Information Element can be added to:

1. a Reservation Request frame by an EN as a request to transition to a standby state or a request to transition to a running state. This request may be initiated by the host requesting the node to transition from Running State (M0) to Standby State (M1) or vice-versa from standby state (M1) to running state (M0). In order to trigger such a request, the node can assert the bit associated with its node ID in the Standby Vector.

Network Management for Node in Standby State

Link Management Operation (LMO)

The NC should reduce the frequency in which it selects a node in Standby State NC to be the "LMO node." The LMN node is typically used to determine GCD (Greatest Common Density period). Link management protocol in general may be used to maintain control channel connectivity, verify the physical connectivity of the data links, correlate the link property information, suppress downstream alarms, and localize link failures for protection/restoration purposes in multiple kinds of networks.

The node in standby state, according to the subject technology, can participate as a node in running state in all the MoCA Network Management Protocol (LMO, topology update, privacy, etc.). There is a difference within standby state. A node in standby state is not required to be selected as an LMO node (master or the LMO) at the same frequency as a node in running state. Rather, a node in standby state can stay in active mode during the whole interval that it is the selected LMO node and can toggle between active and idle mode when it is a slave to "another" LMO mode. The details of the operation of an LMO node according to the subject technology are shown below in the portion of the specification corresponding to FIG. 10.

Figure 11:
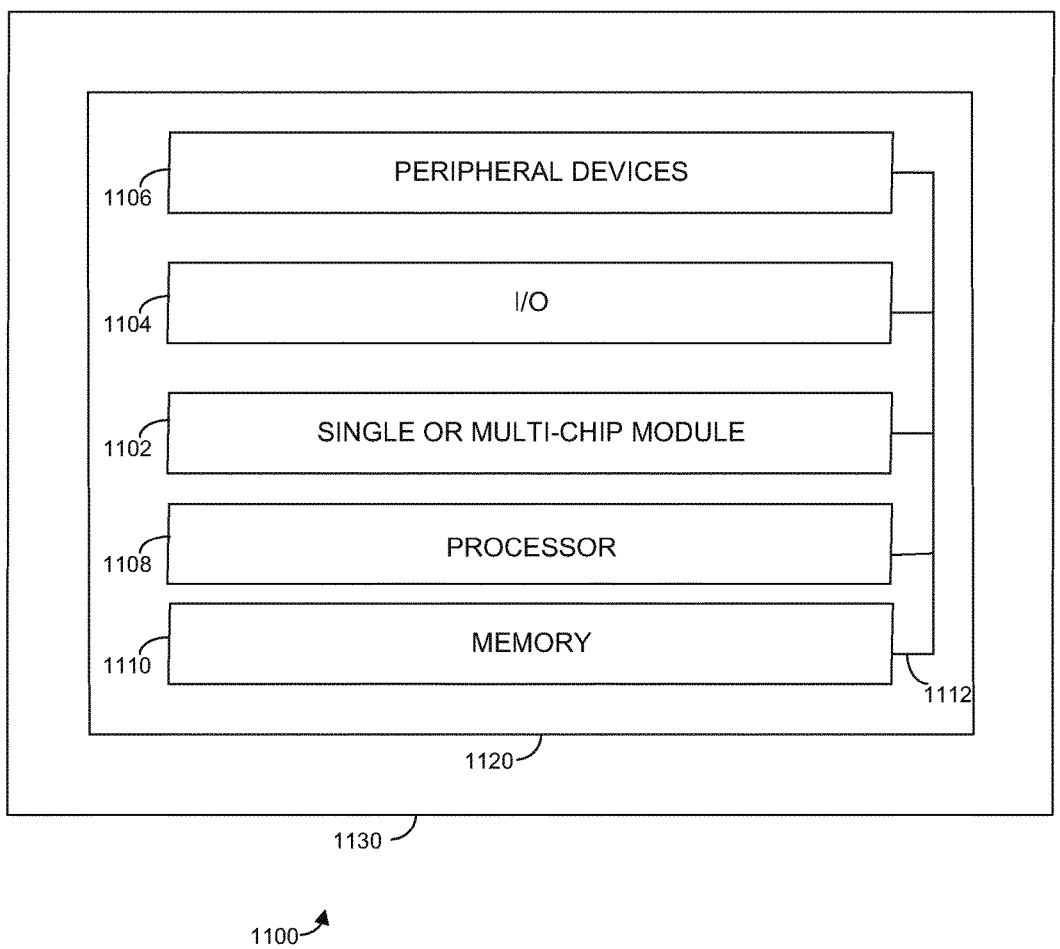
FIG. 11 is a schematic diagram of an illustrative single or multi-chip module of the subject technology in a data processing system.

FIG. 11 shows a single or multi-chip module 1102 according to the subject technology, which can be one or more integrated circuits, in an illustrative data processing system 1100 according to the subject technology. Data processing system 1100 may include one or more of the following components: I/O circuitry 1104, peripheral devices 1106, a processor 1108 and memory 1110. These components are coupled together by a system bus or other interconnections 1112 and are populated on a circuit board 1120 which is contained in an end-user system 1130. System 1100 may be configured for use in a cable television tuner according to the subject technology. It should be noted that system 1100 is only exemplary, and that the true scope and spirit of the subject technology should be indicated by the following claims.

Thus, systems and methods for providing a MoCA power management strategy have been described.

Aspects of the subject technology have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

What is claimed is:

1. A network device, comprising:
one or more memories; and
one or more processor circuits coupled to the one or more memories, the one or more processor circuits configured to cause:
providing for transmission a request directed to a network controller to change a power state of the network device, wherein the network device is configurable to change the power state between a running power state and a standby power state, the standby power state comprising an active mode and an idle mode;
receiving a grant from the network controller in response to the request, and
changing the power state of the network device in response to receiving the grant,
wherein:
the running power state is associated with higher power consumption than the active mode and the idle mode;
the active mode is associated with higher power consumption than the idle mode;
in the active mode, the network device is configured to receive at least one Media Access Plan (MAP); and
in the idle mode, the network device is configured to ignore MAPs.

2. The network device of claim 1, wherein the one or more processor circuits are configured to cause embedding the request in a reservation request and providing for transmission the reservation request.

3. The network device of claim 1, wherein the one or more processor circuits are configured to cause receiving a MAP, the MAP comprising the grant.

4. The network device of claim 1, wherein the one or more processor circuits are configured to cause:
receiving a beacon signal; and
transitioning the network device from the idle mode to the running power state in response to receiving the beacon signal.

5. The network device of claim 1, wherein the one or more processor circuits are configured to cause:
receiving a beacon signal; and
transitioning the network device from the active mode to the running power state in response to receiving the beacon signal.

6. The network device of claim 1, wherein, in the idle mode, the network device is configured to maintain a link to a network.

7. The network device of claim 1, wherein, in the active mode and the idle mode, the network device is configured to receive a beacon signal.

8. The network device of claim 1, wherein, in the active mode, the network device is configured to participate in a link maintenance operation (LMO).

9. A non-transitory tangible computer-readable storage medium storing computer-executable instructions that, when executed by one or more processors, cause one or more processors to perform operations, the operations comprising:
receiving a request for changing a power state of at least one network device between a running power state and a standby power state, wherein the standby power state comprises an active mode and an idle mode; and
providing for transmission a response to the request to change the power state of power state of the at least one network device,
wherein:
the running power state is associated with higher power consumption than the active mode and the idle mode;
the active mode is associated with higher power consumption than the idle mode;
in the active mode, each of the at least one network device is configured to receive at least one Media Access Plan (MAP); and
in the idle mode, each of the at least one network device is configured to ignore MAPs.

10. The non-transitory tangible computer-readable storage medium of claim 9, wherein the receiving the request comprises receiving a reservation request with the request for changing the power state embedded in the reservation request.

11. The non-transitory tangible computer-readable storage medium of claim 9, wherein the operations further comprise embedding, in the response, a grant to the request to change the power state of the at least one network device.

12. The non-transitory tangible computer-readable storage medium of claim 11, wherein the response comprises a MAP.

13. The non-transitory tangible computer-readable storage medium of claim 9, wherein the operations further comprise providing for transmission a beacon signal directed to the at least one network device.

14. A computer-implemented method, comprising:
configuring a power state of a network device to be in a running power state;
providing for transmission a request directed to a network controller to transition the power state of the network device from the running power state to a second power state, wherein:
the second power state is one of an active mode or an idle mode,
the running power state is associated with higher power consumption than the active mode and the idle mode, and
the active mode is associated with higher power consumption than the idle mode;
receiving a signal from the network controller in response to the request; and
transitioning the network device from the running power state to the second power state based on the signal, wherein:
when in the active mode, the network device receives at least one Media Access Plan (MAP), and
when in the idle mode, the network device is not able to receive MAPs.

15. The computer-implemented method of claim 14, wherein the signal comprises a grant to allow transitioning the network device from the running power state to the second power state.

16. The computer-implemented method of claim 14, wherein receiving the signal comprises receiving a MAP with the signal embedded in the MAP.

17. The computer-implemented method of claim 14, further comprising:
receiving a beacon signal; and
transitioning, in response to receiving the beacon signal, the network device to the running power state from one of the idle mode or the active mode.

18. The computer-implemented method of claim 14, wherein maintaining a link to a network while powering down a portion of the network device when the network device is in the idle mode.

19. The computer-implemented method of claim 14, further comprising receiving a beacon signal when the network device is in one of the idle mode or the active mode.

20. The computer-implemented method of claim 14, further comprising participating in a link maintenance operation (LMO) when the network device is in the active mode.

* * * * *